(No Model.)
F. STORK.
MILK CAN COVER.
No. 383,024. Patented May 15, 1888.
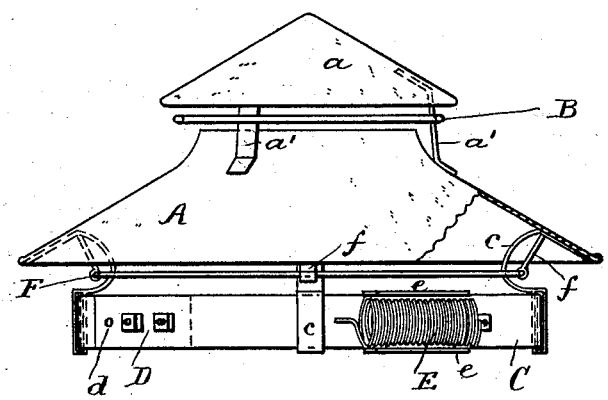
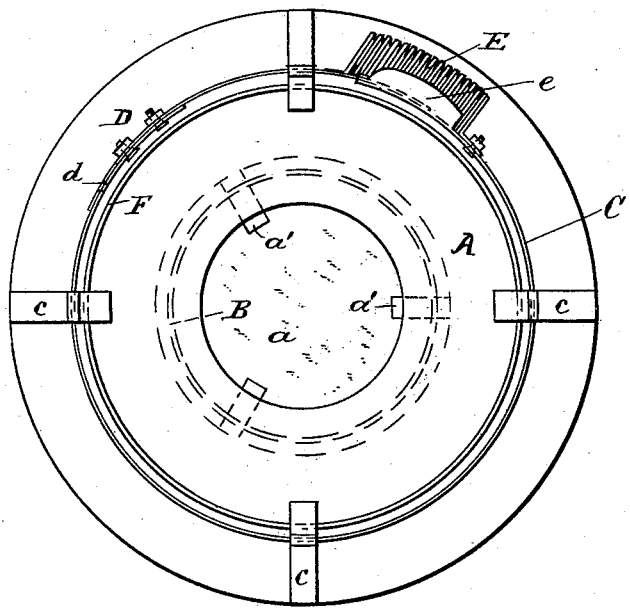
Witnesses.
W. D. Porter.
L. B. Porter.
Inventor,
Fred. Stork,
By his Attorney.
Herbert W. T. Jenner.

UNITED STATES PATENT OFFICE.

FREDERICK STORK, OF KEWASKUM, WISCONSIN.

MILK-CAN COVER.

SPECIFICATION forming part of Letters Patent No. 383,024, dated May 15, 1888.

Application filed February 21, 1888. Serial No. 264,800. (No model.)

*To all whom it may concern:*

Be it known that I, FREDERICK STORK, a citizen of the United States, residing at Kewaskum, in the county of Washington and State of Wisconsin, have invented certain new and useful Improvements in Milk-Can Covers; and I do hereby declare the following to be a full, clear, and exact description of the invention, such as will enable others skilled in the art to which it appertains to make and use the same.

This invention relates to covers to be placed over the tops of cans containing milk or other similar liquid; and it consists in the novel construction and combination of the parts, as hereinafter fully described and claimed, whereby the cover will fit upon various sizes of cans and keep animals from getting at their contents.

In the drawings, Figure 1 is a side view of the cover, and Fig. 2 is a plan view of the same from below.

A is the cover, provided with a top portion, $a$, secured to it by the supports $a'$, so as to leave a ventilating-space between the two parts.

B is a guard-ring of wire secured to the supports $a'$ in the middle of the ventilating-space, to prevent small animals and large insects from entering the can.

C is an adjustable rim secured to the lower part of the cover A by the supports $c$, which are sufficiently elastic to allow the diameter of the rim to be varied. To adjust the rim to different-sized cans, it is made in two parts and secured together by the bolts D, which are passed through any of the series of holes $d$ in the meeting portions of the rim. The ends of the rim are united together by the helical spring E, and one of the ends is provided with the guide $e$ to keep the other overlapping end in position and protect the spring from injury.

The rim C is slipped over the top of the can, so as to leave a ventilating-space all around it.

F is a guard-ring of wire attached by the supports $f$ to the under side of the cover, so as to prevent small animals—such as mice—from crawling in between the cover and the top of the rim. These covers are intended to be placed on the cans at night, so as to allow the milk to be freely ventilated while cooling off. They keep the rain out of the can, and the milk does not turn sour, as it would if kept in a tightly-closed vessel.

The spring-rim causes each cover to fit tightly, so that it cannot be knocked off by cats, or otherwise removed by animals which might try to steal the milk.

What I claim is—

1. The combination, with the cover, of the rim united thereto by elastic supports and provided with a series of holes, and the bolts for securing the rim when adjusted to the desired size, substantially as set forth.

2. The combination, with a cover, of a rim secured thereto by elastic supports, a spring joining the ends of the rim, and a guard-ring secured below the cover in the ventilating-space between it and the rim, substantially as and for the purpose set forth.

3. The combination, with a cover, of a rim united thereto by elastic supports, and a spring joining the ends of the rim and causing it to fit tightly on the can.

4. The combination, with a cover provided with a top portion secured to it by supports, leaving a ventilating-space between the two parts, a rim secured to the under side of the cover by elastic supports, and also leaving a ventilating-space around the cover, a spring joining the ends of the rim, and guard-rings secured in the middle of the said ventilating-spaces, substantially as and for the purpose set forth.

In testimony whereof I affix my signature in presence of two witnesses.

FREDERICK STORK.

Witnesses:
PHILIPP SCHUSTER,
G. A. KUECHENMEISTER.